United States Patent

[11] 3,590,703

| | | |
|---|---|---|
| [72] | Inventor | Shigeo Ono<br>Yokohama-shi, Japan |
| [21] | Appl No | 722,799 |
| [22] | Filed | Apr. 19, 1968 |
| [45] | Patented | July 6, 1971 |
| [73] | Assignee | Nippon Kogaku K.K.<br>Toyko, Japan |
| [32] | Priority | Apr. 24, 1967 |
| [33] | | Japan |
| [31] | | 42/25,809 |

[54] SET VALUE INDICATING APPARATUS FOR SINGLE LENS REFLEX CAMERA
5 Claims, 3 Drawing Figs.

[52] U.S. Cl. .................................................. 95/1.1,
95/11, 95/42
[51] Int. Cl. ................................................. G03b 17/24
[50] Field of Search .......................................... 95/1.1, 11,
42

[56] References Cited
UNITED STATES PATENTS
3,259,039 7/1966 Okajima ...................... 95/1.1

FOREIGN PATENTS
1,381,778 11/1964 France ........................ 95/11 V

Primary Examiner—John M. Horan
Attorney—Anton J. Wille

ABSTRACT: A view finder for a single lens reflex camera is provided in which the exposure data such as shutter speed, lens aperture, distance and the like may be observed; provisions being made to record the data on the photograph. An aperture or window is provided in the camera body for illuminating the data dials. Two pivotable mirrors, a prism and a lens are provided to project an image of the dial data on the border portion of the focusing plate. Both pivotable mirrors are coupled to the shutter release button, the first mirror blocking the incoming light as an exposure is made, the second mirror tilting slightly at the same time. A lamp synchronized with the shutter release button flashing to provide the required light for recording data on the film by the tilted second mirror.

SET VALUE INDICATING APPARATUS FOR SINGLE LENS REFLEX CAMERA

The present invention relates to set value indicating apparatus of single lens reflex camera.

For observing, within the finder of single lens reflex camera, the set values of shutter speed, aperture, the distance from camera to an object to be photographed, or the indicator pointer, it has been proposed to make use of the light from a part of the reflecting surfaces of pentaprism. Another method for attaining this purpose has also been proposed in which a special prism is provided for leading the light from between pentaprism and eyepiece.

However, the methods heretofore used for such cameras, for example the Nikon F, the pentaprism section is constructed interchangeable with other devices or accessories and allows waist level finder observation to be made when desired, have the disadvantage of being unable to observe the set values near the field of view of the finder.

On the other hand, it has been proposed to provide a prism under a pentaprism to bend the light from the side and lead it upward. However, this may interfere with the operation of an interchanged focusing screen or may impair the pentaprism.

An object of the present invention is to avoid such inconveniences as above and to provide a set value indicating apparatus capable of allowing the set values to be observed clearly and independently of the brightness of the object, especially to provide an apparatus fitted for use in camera that has an interchangeable pentaprism and focusing screen.

Another object of the present invention is to provide a set value indicating apparatus capable of recording the indicated set values onto a picture simultaneously when taking the picture.

A further object of the present invention is to provide a set value indicating apparatus capable of intercepting the photographing of the set values at will.

The features of the present invention are as follows:

1. It is possible to read out the various set values clearly either in or in the neighborhood of the view of the finder without being disturbed by the brightness of the object.
2. It is possible to observe the indicated values within or in the neighborhood of the view of the finder when observing the finder at the waist level after detaching the pentaprism.
3. Nothing disturbs the interchange of focusing screen.
4. The degree of freedom of the position that the image forming optical system of the scale can occupy is increased with a jumpup reflecting mirror which forms the finder is included in a portion of the image forming optical system of the scale.
5. The said scale can be easily recorded on the film simultaneously with a picture is taken.
6. It is possible to record on the film the set values by only operating the switch of the illuminant circuit since undesired light does not come to the picture surface because the light admitting window is shielded at picture taking time by the first reflecting mirror interlocked with shutter release button, and since at the same time leaves space between the illuminant and the scales.

According to the present invention, an apparatus for indicating set values of a single lens reflex camera is provided which comprises a scale or indicator pointer interlocked with various kinds of regulators of the camera, a device which illuminates the scale or pointer, an optical system that forms the image of said scale or pointer within or in the neighborhood of the finder view of the camera and on the focusing screen, an observation optical system that leads the formed image to the eye, said image forming optical system and the observation optical system being arranged such that said scale or pointer is optically outside the effective exit pupil of the phototaking lens with reference to the image formed point. The present invention further provides with means for interlocking the operation of intercepting between the illuminating device and phototaking image surface with a member operated prior to the shutter operation; that the reflecting mirror which forms the finder of the camera is constructed to be used as a part of said image forming optical system and lead said image forming optical system to the film surface when the mirror is raised; and further comprises a flash device interlocked with the shutter being added to the image forming optical system to enable the set values to be recorded on the film when picturetaking is made.

The invention will be better understood from the following description taken in connection with the accompanying drawing, in which.

Figure 1:
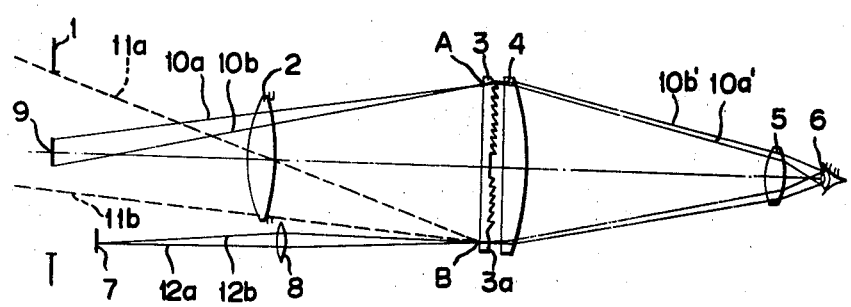
FIG. 1 is a diagram for light path that indicates the principle of the present invention.

In FIG. 1, 1 represents the exit pupil of the phototaking lens, 2 the rear end lens, 3 the fresnel focusing screen, 4 the condenser lens, 5 the eyepiece, 6 the pupil of eye, 7 the scale plate, 8 the lens that forms the image of said scale, 9 the image of pupil 6 formed by said fresnel focusing screen 3, condenser lens 4, and eyepiece 5. In this drawing the reflecting mirror that composes the finder and the pentaprism are omitted and the path of light is shown straight.

To explain the operation of the finder of a single lens reflex camera, with respect to a point A on the focusing screen, the light flux within the light tube 10a, 10b that see the image of pupil 9 is refracted by the fresnel lens 3, condenser lens 4, and eyepiece 5, becomes light tube 10a', 10b' and enters the pupil 6. Since the finder is so designed that such relationship should be established all over the view field of the finder, the entire scene can be brightly illuminated. On the other hand, however, the set values are liable to be invisible by the brightness of the object when their images are projected on the focusing screen 3.

It is intended, therefore, that in the present invention the light for indication 12a, 12b that comes in from outside the range shown by dotted lines 11a, 11b of the angle that sees the effective exit pupil of the phototaking lens with respect to the portion B where the set values are projected is designed to reach the pupil 6 by for instance modifying a portion of the fresnel lens. That is, by forming a part 3a of the focusing screen 3 into an appropriate shape, for instance, into plane, prism, cylindrical surface, sphere, or combination of them, the image of scale 7 formed by the lens 8 on the B section of the focusing screen 3 is led to the pupil 6 in such a manner as if the image come in from outside the range 11a, 11b of the effective pupil of the taking lens with respect to B. In this way the range that indicates the set values is not affected by the brightness of the object and can be read clearly.

Figure 2:
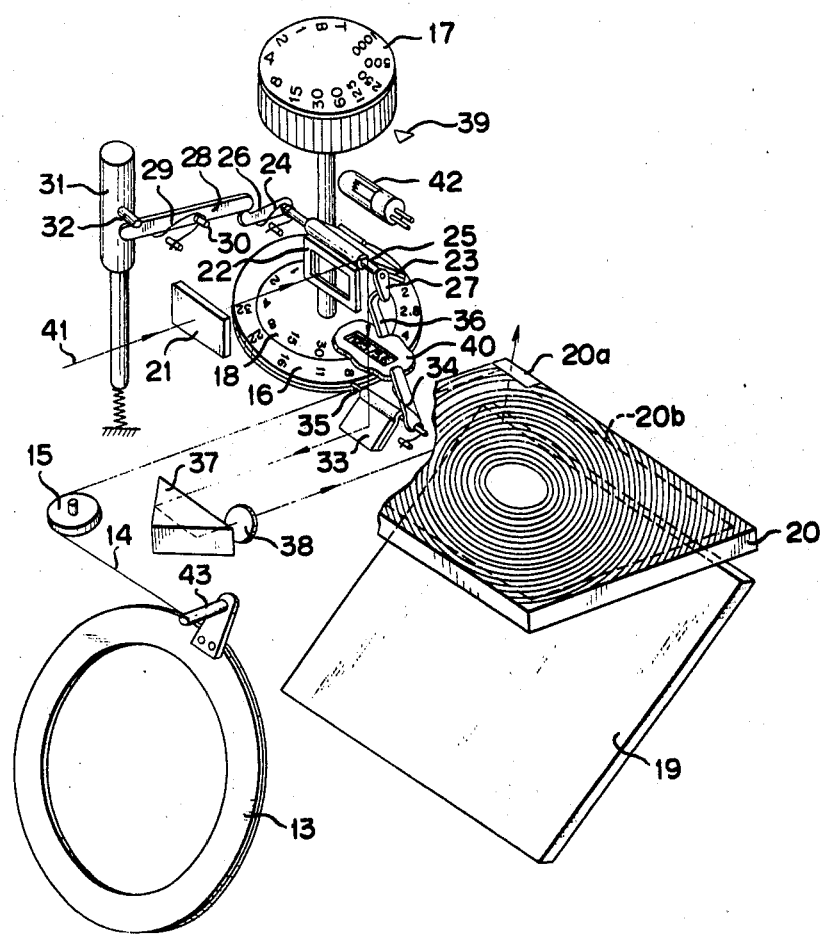
FIG. 2 is a perspective view of an embodiment of the present invention.

FIG. 2 shows a perspective view of an embodiment of the present invention. In this drawing, 13 represents the aperture interlocking ring that rotates concentrically with the optical axis of the phototaking lens. The ring 13 is provided with a pin 43 that interlocks it with the aperture adjusting ring of the phototaking lens (not illustrated). The outer surface of the interlocking ring 13 has a groove in which a fine wire is disposed. This wire is wound around the aperture scale plate 16 via the pulley 15; 17 is a shutter speed adjusting knob, and 18 is the shutter speed scale plate that rotates together with 17; 19 is the reflecting mirror that is lifted out of the path of light when taking pictures; 20 is the focusing screen described previously, the upper surface of which forms a fresnel lens. Moreover, in this embodiment, the set value indicating section 20a is outside the field of view of the finder 20b shown by dotted lines; 21 is the lighting window and 22 the frame of the lighting window, and both of them are fixedly installed on the body of camera; 23 is the first reflecting mirror which is given with the rotating habit around the shaft 25 in clockwise direction by the spring 24; 26 and 27 are the levers provided together with the shaft 25, 28 is a lever which is given with rotating habit in clockwise direction by the spring 29 and which is connected to the lever 26 at one end and to the pin 32 which is combined with the shutter release button 31 at the other; 33 is the second reflecting mirror that is given with rotating habit around the shaft 35 in clockwise direction. The lever 36 provided unitary with the shaft 35 is connected to the above-mentioned lever 27. And 37 is a prism and 38 is the lens that forms the images of the above-mentioned scales of the scale plates 16 and 18 on the focusing screen. Member 39 is the index for shutter speed and 40 is the scale indicating window for the above-mentioned aperture scale plate 16 and shutter speed scale plate 18.

Figure 3:
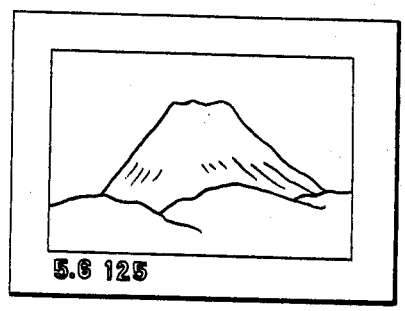
FIG. 3 is a drawing that shows the finder view.

The operation of the apparatus is explained below. First, when the shutter speed adjusting knob 17 is rotated to bring the desired value to the index mark 39, the set value appears in the indicating window 40. On the other hand, the light 41 that enters the lighting window 21 passes the first reflecting mirror 23 and advances in the direction indicated by the arrow mark and illuminates the indicating window 40. Therefore, the image of the scale is formed on the set value indicating section 20a by the second reflecting mirror 33, prism 37, lens 38, and reflecting mirror 19. Since this image is seen as if it came from outside the effective exit pupil of the phototaking lens as shown in FIG. 1, it is clearly seen outside the field of view as shown in FIG. 3 if only the numerals of the scale are made transparent.

Next, when the shutter release button 31 is depressed, the first reflecting mirror 23 rotates clockwise by the action of the spring 24 and shields the window 22. This prevents the undesired light from reaching the film when taking a picture. Moreover, an electric lamp is installed to this embodiment, which, when flashed in synchronization with the shutter, allows the indicated values to be recorded on the picture. For this purpose the second reflecting mirror 33 interlocks with the shutter button 31 and inclines slightly to bring the scale within the picture.

This invention shall not be limited to the embodiment described above but be able to be modified to various forms as shown by the following:

1. The indicating place of the scales can be positioned within the view of the finder. In this case also indicating section should be made transparent when the focusing screen has a matt surface to improve the visibility of the indication.
2. It is possible to make a cut in the wall of the picture frame to record the scales of the outside of the picture. In this case the second reflecting mirror 33 can be installed to a fixed position.
3. The electric lamp 42 can be either a strobe tube or a luminous diode or the like, and when the camera is provided with a focal plane shutter than runs horizontally a better synchronization with strobe light can be attained by establishing the indicating section 20a perpendicular to the position shown in FIG. 2 and lengthwise.
4. It is possible to make the second reflecting mirror 33 to rotate until it reaches the horizontal position when taking a picture and to provide other scale, for example for date, behind it to have the new scale recorded on the film too.
5. The said scale can also be positioned in front of the second reflecting mirror 33.
6. The electric lamp 42 and the above-mentioned dating device can be made detachable from the camera.
7. The positions of the scale plates 16 and 18 can be determined to any places within the camera, and a scale can be replaced with the pointer of an exposure meter.
8. It is possible to have the interlocking ring 13 interlock with the distance adjusting ring of the phototaking lens to indicate the camera-to-object distance.
9. In order to read the scales through the finder, a special prism can be placed in the neighborhood of the indicating section 20a instead of making the section 20a take an appropriate shape. For example, the indicating section can be bonded to the lower surface of the condenser lens.
10. It is possible to interlock the first reflecting mirror 23 with, for example, the reflecting mirror 19.
11. In special cases, an appropriate lamp can be used instead of the lighting window 21 to illuminate the set values. Of course, the present invention can be applied widely regardless of, for example, the lens interchangeability and the kind of shutter system.

What I claim is:

1. A single lens reflex camera comprising, in combination,
   a view finder having an eyepiece,
   a shutter releasing member on the camera body,
   a viewing mirror movable between an exposure position and a viewing position in response to operation of said shutter releasing member,
   a focusing plate having an area restricted within field of view of said view finder for receiving light rays from the exit pupil of said camera objective and a transparent portion adjacent to said area, exposure condition indicating means arranged in the camera housing and having scale markings movable in cooperation with the exposure factor setting means of the camera, means for illuminating said indicating means, a scale indicating optical system provided in the camera housing for directing an image of said scale markings toward said transparent portion of said focusing plate through said viewing mirror, said viewing mirror deflecting respectively the light rays passing through said camera objective and the light rays passing through said scale indicating optical system into the focusing plane of said view finder when said mirror is in said viewing position, said transparent portion of the focusing plate being formed to refract said light rays from said scale markings toward said eyepiece.

2. A single lens reflex camera according to claim 1, wherein said illuminating means includes a window provided on the camera housing, and a hinged mirror movable by said shutter releasing member between a first position to direct the light rays from said window to said indicating means and a second position to shield said window, when said hinged mirror is located in said second position, said viewing mirror is moved toward said exposure position.

3. A single lens reflex camera according to claim 1, wherein said scale indicating optical means includes means for forming an image of said scale markings on said focusing plate and a second pivoted mirror slightly moved by said shutter releasing member between a first position in which to direct the image of said scale marking onto said transparent portion of said focusing plate and a second position in which to direct the same image into the field of view of said view finder, when said second pivoted mirror is moved to said second position and said viewing mirror is located in said exposure position, the image of said scale marking is formed in the picture.

4. A single lens reflex camera according to claim 3 wherein, said illuminating means further includes an artificial light source provided in the camera housing for illuminating said scale markings when said second pivoted mirror is in its second position and the viewing mirror is in its exposure position.

5. Apparatus for indicating the set values of a single lens reflex camera, comprising
   exposure data indicating means interlocked with and set by settable mechanisms of the camera,
   an observation optical system for forming an image of said indicating means on the focusing screen within the viewfinder of the camera,
   an image forming optical system for the camera including an objective to project an image of the object to be photographed on the focusing screen of the viewfinder; the observation optical system being arranged to be optically separate from and outside of the effective exit pupil of the objective,
   means for illuminating said indicating means,
   said illuminating means includes means for artificially illuminating said data indicating means and means for accepting natural light for illuminating said data indicating means, and means interlocked with the shutter release mechanism of the camera for blocking the natural light and artificially illuminating said data indicating means upon release of the camera shutter